(12) United States Patent
Schneider et al.

(10) Patent No.: US 12,077,884 B2
(45) Date of Patent: Sep. 3, 2024

(54) OPTIMIZING A YARN PRODUCTION PROCESS WITH RESPECT TO FOREIGN MATERIALS

(71) Applicant: Uster Technologies AG, Uster (CH)

(72) Inventors: Ulf Schneider, Uster (CH); Mario Siegenthaler, Herdern (CH)

(73) Assignee: Uster Technologies AG, Uster (CH)

( * ) Notice: Subject to any disclaimer, the term of this patent is extended or adjusted under 35 U.S.C. 154(b) by 361 days.

(21) Appl. No.: 17/632,111

(22) PCT Filed: Sep. 15, 2020

(86) PCT No.: PCT/CH2020/000012
§ 371 (c)(1),
(2) Date: Feb. 1, 2022

(87) PCT Pub. No.: WO2021/051210
PCT Pub. Date: Mar. 25, 2021

(65) Prior Publication Data
US 2022/0275542 A1    Sep. 1, 2022

(30) Foreign Application Priority Data

Sep. 17, 2019    (CH) ..................................... 01176/19

(51) Int. Cl.
*D01G 31/00*    (2006.01)
*D01H 13/22*    (2006.01)
*G06T 7/00*    (2017.01)

(52) U.S. Cl.
CPC ........... *D01H 13/22* (2013.01); *D01G 31/003* (2013.01); *G06T 7/001* (2013.01); *G06T 2207/30124* (2013.01)

(58) Field of Classification Search
CPC .......... G06T 7/001; G06T 2207/30124; D01H 13/22; D01G 31/003; G01N 21/8806; G01N 21/0627
See application file for complete search history.

(56) References Cited

U.S. PATENT DOCUMENTS 5,229,841 A * 7/1993 Taranowski ............ G01J 3/501
356/406
6,052,182 A    4/2000 Irick et al.
(Continued)

FOREIGN PATENT DOCUMENTS

DE        29622931 U1    9/1997
GB        2316099 A  *  2/1998 ............. D01G 21/00
(Continued)

OTHER PUBLICATIONS

"Uster® Jossi Vision Shield 2—The key to Total Contamination Control", Uster Technologies AG, Oct. 2015.
(Continued)

*Primary Examiner* — Tajash D Patel
(74) *Attorney, Agent, or Firm* — TechnicalAttorney; Rick Barnes (57) ABSTRACT

The invention relates to a method for optimizing a yarn production process in which foreign materials (90) are monitored in a textile fiber formation (9). The textile fiber formation (9) is illuminated with electromagnetic radiation from at least two color ranges. The foreign materials (90) are classified into different color classes according to their colors. If a sufficiently large random sample with classified foreign materials (90) is available, a frequency distribution of the foreign materials is determined for the color classes and compared with a reference frequency distribution. If the determined frequency distribution deviates from the reference frequency distribution, at least one of a set of multiple
(Continued)

optimization actions is performed, e.g., a warning signal is output.

21 Claims, 4 Drawing Sheets

(56) References Cited

U.S. PATENT DOCUMENTS

| | | |
|---|---|---|
| 6,244,030 B1 | 6/2001 | Arb et al. |
| 6,452,157 B1 | 9/2002 | Hösel |
| 10,190,990 B2 * | 1/2019 | Dehkordi ............ G01N 21/8806 |
| 2001/0049860 A1 | 12/2001 | Jossi et al. |
| 2020/0202504 A1 * | 6/2020 | Shchemelinin ......... G06T 7/001 |
| 2021/0012499 A1 * | 1/2021 | Adler .................... G06F 30/398 |

FOREIGN PATENT DOCUMENTS

| | | | |
|---|---|---|---|
| GB | 2486797 A | 6/2012 | |
| WO | 2006079426 A1 | 8/2006 | |
| WO | 2007010325 A1 | 1/2007 | |
| WO | WO-2016149848 A1 * | 9/2016 | ................ G01J 3/46 |
| WO | 2017190259 A1 | 11/2017 | |
| WO | 2019173929 A1 | 9/2019 | |

OTHER PUBLICATIONS

Uster® News Bulletin No. 47 "The origins of fabric defects—and ways to reduce them", Uster Technologies AG, Mar. 2010.
Uster® Quantum 3, Application Handbook, Yarn clearing on winding machines, Textile Technology / V1.0 / Apr. 2011 / 316 050-10020, Uster Technologies AG.

* cited by examiner

OPTIMIZING A YARN PRODUCTION PROCESS WITH RESPECT TO FOREIGN MATERIALS

FIELD OF THE INVENTION

The present invention is in the field of yarn manufacturing. It relates to a method and device for optimizing a yarn production process in which foreign materials in a textile fiber formation are monitored, according to the independent patent claims.

DESCRIPTION OF THE PRIOR ART

Foreign materials in the yarn represent one of the major problems of today's spinning mills. These are materials that differ from the intended base material of the yarn fibers, e.g. cotton fibers. They can be of various origins, such as plastic packaging, cords, human or animal hair, etc. Foreign materials cause yarn breaks during spinning and weaving, take dye in a different way than the base material and affect the appearance of the final textile product. They significantly reduce the value of the final product. An overview of fabric defects caused by foreign materials and recommendations for their reduction is given in Para. 3.8 of USTER® NEWS BULLETIN NO. 47 "The origins of fabric defects—and ways to reduce them", Uster Technologies AG, March 2010.

WO-2006/079426 A1 discloses a method and a device for separating foreign substances in fiber material, in particular in raw cotton. Such methods are used, for example, in the blow room to prepare the raw cotton for spinning. The fiber material is fed in a pneumatic fiber transport line one after the other past a sensor system and a separation device. When foreign materials are detected by the sensor system, they are separated from the fiber transport line by means of a compressed air pulse directed transversely to the fiber transport line through a separation opening in the fiber transport line. A corresponding fiber cleaner is described in the brochure "USTER®JOSSI VISION SHIELD 2—The key to Total Contamination Control", Uster Technologies AG, October 2015.

Further downstream in the textile production process, foreign materials can be removed from the yarn on spinning or winding machines by so-called yarn clearers. A yarn clearer contains a measuring head having at least one sensor that scans the moving yarn and detects yarn defects such as foreign materials or thick and thin spots. The output signal from the sensor is continuously evaluated according to predetermined criteria. U.S. Pat. No. 6,244,030 B1 discloses a yarn clearer that not only detects foreign materials, but also distinguishes between different types of foreign materials. The sensor optically scans the yarn by incident light. A classifying field or matrix is provided. Along the horizontal axis of the classifying field, the length of yarn sections is plotted, and along the vertical axis, the reflectivity of light on the yarn is plotted. The classifying field is divided into 16 classes for light foreign materials and 16 classes for dark foreign materials. Yarn sections of the same class are counted. A corresponding product is described in the brochure "USTER® QUANTUM 3 Application Handbook", Para. 8.4, Uster Technologies AG, April 2011. A yarn clearer that scans the yarn with several different colored light components is known from WO-2011/026249 A1.

WO-2017/190259 A1 describes a method and device for monitoring impurities in a fiber flock stream. In one embodiment, a first monitoring device monitors impurities in a fiber flock stream, while a second monitoring device monitors impurities downstream in the textile production process. The second monitoring device may be a yarn clearer on a winding machine. A control unit is connected to the first and second monitoring devices. It collects data from the two monitoring devices, evaluates them statistically, and outputs reports produced therefrom to an operator. In a control loop, a limit for removing impurities in the first monitoring device is changed depending on a monitoring result from the second monitoring device.

U.S. Pat. No. 6,452,157 B1 relates to a device on a fiber processing apparatus for detecting and processing impurities, foreign substances and fibers in textile fiber material. The device has at least two light sources which alternately illuminate the fiber material with different colors. Also provided is a sensor that receives the colors of the light reflected from the fiber material. When the color of the fiber material changes abruptly from a predetermined color, an electrical signal is generated. To enable adaptation of the luminous colors according to the application, e.g., to different or changing color of the fiber material, a multicolor light source with more than two colors is used. The type of colors of the multicolor light source can be selected depending on the color of the fiber material to be illuminated.

DE-296'22'931 U1 describes a device in a spinning preparation plant for detecting and evaluating foreign substances in or from fiber material. An optical sensor system is connected to an image processing device, which is connected to an electronic regulation and control device. Light sources with different wavelengths can be used to illuminate the fiber material. After a learning phase, the separation sensitivity for the foreign substances is determined, wherein the limits can be varied automatically and/or semi-automatically. Measurement signals from the image processing device are compared with stored target values. Foreign material with deviating characteristics is removed from the fiber material.

SUMMARY OF THE INVENTION

It is an object of the present invention to provide a method and an improved device for optimizing a yarn production process in which foreign materials in a textile fiber formation are monitored.

These and other objects are solved by the method and device according to the invention, as defined in the independent patent claims. Advantageous embodiments are indicated in the dependent patent claims.

The invention is based on the idea of classifying the foreign materials into different color classes depending on their color. When a sample of classified foreign materials is available, a frequency distribution of the foreign materials for the color classes is determined. If the frequency distribution deviates from a reference frequency distribution, an optimization action is taken, e.g., a warning signal is issued.

According to the invention, therefore, a statistical evaluation of the classified foreign materials is carried out only subsequently, when a statistically relevant sample is available. As a result, the yarn production process can be optimized in the medium and long term. The invention is thus not aimed at an immediate reaction, such as a single rejection of a foreign material.

With knowledge of the invention, the person skilled in the art is able to determine the required size of the sample and to assess the relevance of the deviation. The sample size and deviation relevance depend in part on the particular circumstances. In many cases, simple, empirical procedures will suffice. The relevant principles for a theoretical consideration are set out, for example, in the book "Statistische Methoden bei textilen Untersuchungen" (Statistical methods in textile studies) by Graf, Henning and Wilrich, 2nd edition, Springer-Verlag, 1974.

The method according to the invention serves to optimize a yarn production process in which foreign materials in a textile fiber formation are monitored. The textile fiber formation is irradiated with electromagnetic radiation from at least two different subranges of the electromagnetic spectrum. The electromagnetic radiation interacts with the foreign materials. Foreign materials are detected based on their interaction with the electromagnetic radiation. A color class of foreign materials is assigned to each of the at least two different subranges of the electromagnetic spectrum depending on the interaction of the electromagnetic radiation in the relevant subrange of the electromagnetic spectrum with the foreign materials. The detected foreign materials are automatically classified in the at least two color classes depending on their interaction with the electromagnetic radiation in the relevant subrange of the electromagnetic spectrum. When a sample having a plurality of classified foreign materials is available, a frequency distribution of the foreign materials for the color classes is automatically determined. The determined frequency distribution is automatically compared with a reference frequency distribution. If the determined frequency distribution deviates significantly from the reference frequency distribution, at least one of a set of multiple optimization actions is performed.

The set of multiple optimization actions may include at least one of the following:
a warning signal is output;
a recommendation is issued;
the determined frequency distribution is output.

In one embodiment, a separation criterion is defined for each of the at least two color classes. Foreign materials are separated from the textile fiber formation according to the at least two separation criteria. The frequency distribution refers to the foreign materials separated from the textile fiber formation and/or the foreign materials remaining in the textile fiber formation. In this embodiment, the set of multiple optimization actions may include any of the following:
the separation criterion defined for the relevant color class is changed in such a way that, with the textile fiber formation remaining unchanged, more foreign materials in the relevant color class are separated from the textile fiber formation;
the separation criterion defined for the relevant color class is changed in such a way that, with the textile fiber formation remaining unchanged, fewer foreign materials in the relevant color class are separated from the textile fiber formation.

The at least two separation criteria are preferably dependent on a reflectivity and/or transmissivity of the foreign materials in the relevant subrange of the electromagnetic spectrum. The at least two separation criteria are preferably dependent on a spatial extension of the foreign materials.

In one embodiment, the reference frequency distribution depends on at least one previously determined frequency distribution of the foreign materials for the color classes.

In one embodiment, the reference frequency distribution is dependent on at least one frequency distribution of the foreign materials for the color classes determined on another, similar textile fiber formation.

The textile fiber formation is, for example, a fiber flock stream or a yarn.

In one embodiment, the reference frequency distribution is dependent on at least one frequency distribution of the foreign materials for the color classes determined at a downstream textile fiber formation produced from the textile fiber formation in the textile production process. In this case, the textile fiber formation may be a fiber flock stream and the downstream textile fiber formation may be a yarn.

In one embodiment, the reference frequency distribution is dependent on at least one frequency distribution of the foreign materials for the color classes determined at a textile fiber formation upstream in the textile production process from which the textile fiber formation is made. In this case, the textile fiber formation may be a yarn and the upstream textile fiber formation may be a fiber flock stream.

In one embodiment, during the interaction of the electromagnetic radiation with the foreign materials, an image or one image each of the textile fiber formation is recorded in the at least two different subranges of the electromagnetic spectrum. The image or the at least two images are processed by means of image processing. The foreign materials are detected based on data resulting from the corresponding image processing.

In one embodiment, the sample consists of at least 500 and preferably at least 5000 classified foreign materials.

The device according to the invention serves to optimize a yarn production process in which foreign materials in a textile fiber formation are monitored. It includes at least one light source for illuminating the textile fiber formation with electromagnetic radiation from at least two different subranges of the electromagnetic spectrum, at least one sensor system for detecting foreign materials based on their interaction with the electromagnetic radiation, and an evaluation unit connected to the sensor system for evaluating an output signal of the sensor system. The evaluation unit is configured to assign a color class of foreign materials to each of the at least two different subranges of the electromagnetic spectrum depending on the interaction of the electromagnetic radiation in the relevant subrange of the electromagnetic spectrum with the foreign materials, to classify the detected foreign materials in the at least two color classes depending on their interaction with the electromagnetic radiation in the relevant subrange of the electromagnetic spectrum, to determine a frequency distribution of the foreign materials for the color classes when a sample with a plurality of classified foreign materials is available, to compare the determined frequency distribution with a reference frequency distribution, and in the event of a significant deviation of the determined frequency distribution from the reference frequency distribution, to automatically trigger at least one of a set of multiple optimization actions.

The set of multiple optimization actions may include at least one of the following:
a warning signal is output;
a recommendation is issued;
the determined frequency distribution is output.

In one embodiment, the device additionally includes a separation unit for selectively separating objects from the textile fiber formation. The evaluation unit is connected to the separation unit and is configured to store a separation criterion for each of the at least two color classes, to trigger a separation of the foreign materials from the textile fiber formation by the separation unit according to the at least two separation criteria, and to determine the frequency distribution such that it relates to the foreign materials separated from the textile fiber formation and/or the foreign materials remaining in the textile fiber formation. In this embodiment, the set of multiple optimization actions may include any of the following:

the separation criterion defined for the relevant color class is changed in such a way that, with the textile fiber formation remaining unchanged, more foreign materials in the relevant color class are separated from the textile fiber formation;

the separation criterion defined for the relevant color class is changed in such a way that, with the textile fiber formation remaining unchanged, fewer foreign materials in the relevant color class are separated from the textile fiber formation.

The device is, for example, a fiber cleaner or a yarn clearer.

The sensor system may include at least one digital camera.

The invention optimizes the yarn production process with regard to foreign materials. It makes it possible to react to changes in the raw material and/or to unsuitable process settings. Thanks to the invention, the cause of the change in the color distribution of the foreign materials can be specifically searched for and found more quickly and reliably. The reliability results from the statistical evaluation of a sufficiently large sample, whereby individual events are practically irrelevant. A further advantage of the invention is that, on the one hand, inadmissible, separated foreign materials can be taken into account, and on the other hand, admissible foreign materials remaining in the fiber flock stream can also be taken into account. The latter can also provide valuable indications of changes in the raw material, for example.

In this document, unless otherwise specified, terms such as "light," "illuminate," and "color" refer not only to the visible portion of the electromagnetic spectrum, but to the entire electromagnetic spectrum, preferably to electromagnetic radiation in the ultraviolet, visible, and/or infrared range. The term "part of the electromagnetic spectrum" as used in this document means a part of the spectrum which may or may not be contiguous.

BRIEF DESCRIPTION OF THE DRAWINGS

In the following, an embodiment of the invention is explained in detail with reference to the drawings.

DETAILED DESCRIPTION OF THE PREFERRED EMBODIMENT

In the following, only one possible embodiment of the invention is discussed, namely the monitoring of foreign materials in a fiber flock stream by a fiber cleaner in the blow room. However, this is in no way intended to limit the generality of the invention. Alternatively, the textile fiber formation may be a sliver, a roving, a yarn or a woven fabric. In the case of yarn, the device according to the invention is preferably a yarn clearer.

Figure 1:
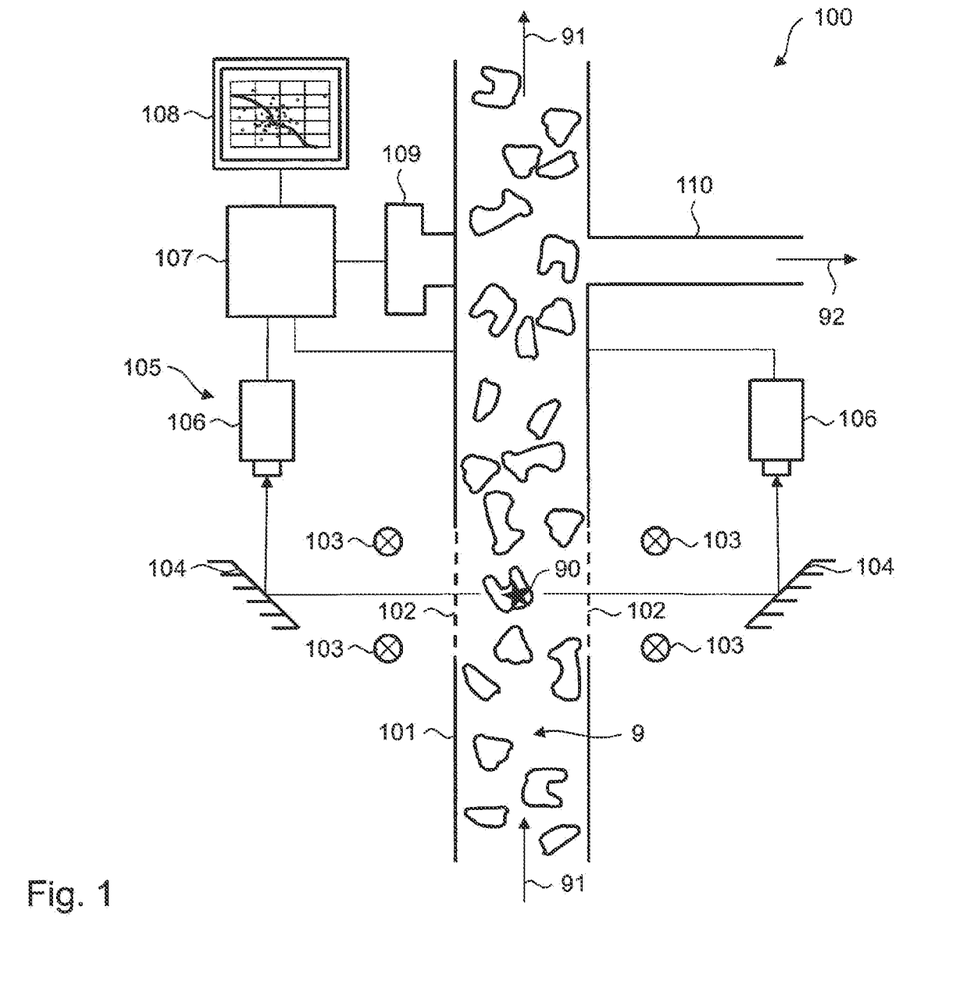
FIG. 1 shows schematically a device according to the invention.

FIG. 1 schematically shows a device 100 according to the invention. The device 100 serves to optimize a yarn production process. It monitors foreign materials 90 in a textile fiber formation 9, which in the present example is a fiber flock stream. It includes a pneumatic fiber transport channel 101 for pneumatically transporting the fiber flock stream 9 in an air stream. The direction of transport of the fiber flock stream 9 and the air stream is indicated by arrows 91 in FIG. 1.

Four light sources 103, such as fluorescent tubes, are arranged near windows 102 in a wall of the fiber transport channel 101. The light sources 103 illuminate the fiber flock stream 9 in the fiber transport channel 101 from different directions.

A sensor system 105 is arranged at the fiber transport channel 101. It detects properties of objects, including foreign materials 90, in the fiber flock stream 9. In the embodiment of FIG. 1, the sensor system 105 includes two cameras 106, e.g., CCD cameras, which capture images of the fiber flock stream 9 through the windows 102 from two different directions. The light emitted by the light sources 103, after interacting with the fiber flock stream 9, can be deflected between the windows 102 and the cameras 106 by means of appropriately tilted mirrors 104. The cameras 106 are only one example of a sensor system 105; other or additional sensor systems may be used in the device 100 of the invention. Such alternative or additional sensor systems may detect properties of objects due to electromagnetic waves in the visible or invisible range, including ultraviolet, infrared, and microwaves, acoustic waves, etc. Other alternative or additional sensor systems do not require light sources.

Figure 2:
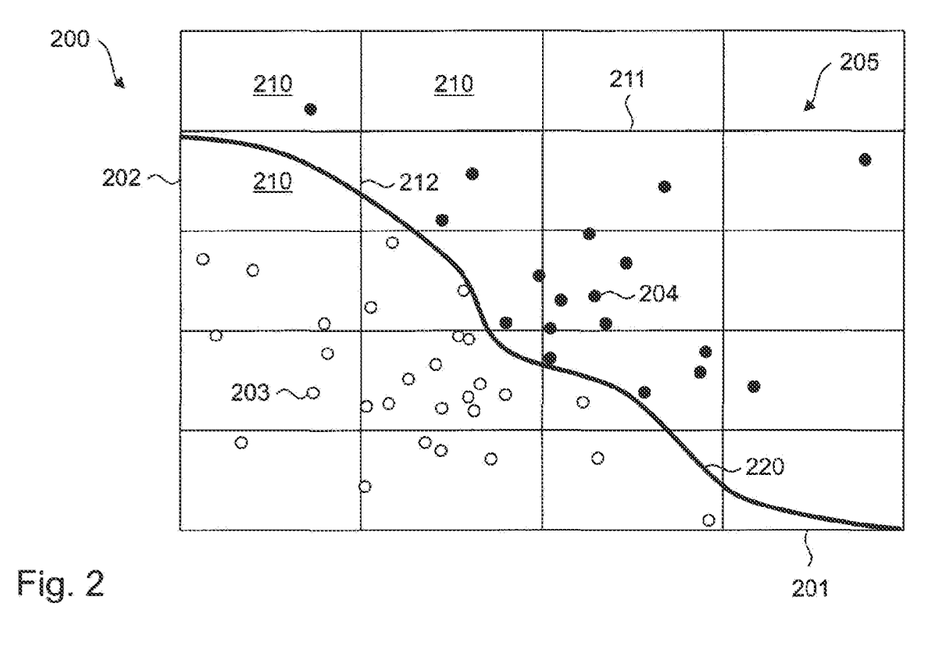
FIG. 2 shows an exemplary separation criterion for foreign materials in a stream of fiber flocks.

The cameras 106 are connected to an evaluation unit 107 for automatic evaluation of output signals of the sensor system 105. The evaluation unit 107 is configured to determine values of a first and a second parameter of the objects from the output signals of the sensor system 105. The evaluation unit 107 is further configured to provide an event field 200 as shown in FIG. 2. Furthermore, the evaluation unit 107 is configured to enter the first and second parameters determined for an object as coordinates of an event 203, 204 in the event field 200. The evaluation unit 107 is preferably designed as a computer.

The evaluation unit 107 is connected to an output unit 108 for outputting a result of the evaluation. The output unit 108 is configured to output a graphical representation of the event field 200, as shown in FIG. 2. The output unit 108 may be, for example, a computer screen or a printer. In one embodiment, it is designed as a touchscreen and thus serves as an input and output unit.

A separation unit 109 is arranged at the fiber transport channel 101 downstream of the sensor system 105 (with respect to the transport direction 91). The separation unit 109 is used for selective separation of objects from the fiber flock stream 9. Such a separation unit 109 is known per se, for instance from WO-2006/079426 A1. In a preferred embodiment, it includes a plurality of pressurized air nozzles that are individually controllable by the evaluation unit 107. When the sensor system 105 detects an unacceptable foreign material 90 in the fiber flock stream 9, the respective air nozzle of the separation unit 109 is caused to blow out compressed air perpendicular to the transport direction 91 when the foreign material 90 has arrived at the level of the separation unit 109. This causes the foreign material 90 to be blown out into a separation channel 110, which is formed from the fiber transport channel 101 in a separation direction 92 that is substantially perpendicular to the transport direction 91. The uncontaminated fiber flocks, on the other hand, continue their journey with the fiber flock stream 9 to be further processed.

The separation unit 109 can be controlled by the evaluation unit 107 and/or directly by the sensor system 105. In the latter case, a microprocessor may be associated with each camera 106, and the cameras 106 may be directly connected to the separation unit 109. Such direct connections are not shown in FIG. 1 for simplicity. In another alternative, the separation unit 109 is controlled by a microprocessor associated with the separation unit 109 itself.

As mentioned above, a graphical representation of the event field 200 provided by the evaluation unit 107 may be output on the output unit 108. An example of a graphical representation of the event field 200 is shown in FIG. 2. The event field 200 includes a quadrant or a part of a quadrant of a two-dimensional Cartesian coordinate system. The first parameter is plotted along a first axis 201, such as the abscissa, and the second parameter is plotted along a second axis 202, such as the ordinate. The first parameter may relate to a geometric property of the objects and is preferably a length or area of the objects. The second parameter may relate to an optical property of the objects and is preferably an intensity of light reflected and/or transmitted by the objects. The values of the first parameter and the second parameter determined for an object are entered into the event field 200 as coordinates of the object. Thus, an object is represented by a graphical symbol 203, 204, such as a dot, located at the location corresponding to the coordinates of the object. Such a representation of an object in the event field 200 is hereinafter referred to as an "event" 203, 204. A plurality of events 203, 204 generates a scatter plot 205 showing the coordinates of the corresponding objects.

In one embodiment of the invention, at least two object classes of objects are predetermined in the form of non-overlapping areas 210 in the event field 200. In the example of FIG. 2, the areas 210 are adjacent rectangles delimited from each other by straight lines 211, 212 that are parallel to the first axis 201 and the second axis 202, respectively. In the exemplary embodiment of FIG. 2, there are 4×5=20 object classes 210; other object classifications with other shapes and/or a different number of object classes 210 are possible. An event 203, 204 is classified in one of the at least two object classes 210 when the coordinates of the event 203, 204 are located in the relevant area 210. Events 203, 204 that are in at least one of the at least two object classes 210 are counted, and the individual counted numbers of events 203, 204 are output for each of the at least one object class 210. The counted numbers of events 203, 204 may be output instead of or in addition to the graphical representation of FIG. 2. The object classification helps to numerically characterize the foreign materials 90 contained in the fiber flock stream 9. It is to be distinguished from the color classification described further below.

A separation curve 220 representing a separation criterion for foreign materials may be drawn in the event field 200 and output along with the event field 200. The separation criterion is predetermined as a criterion for the admissibility or inadmissibility of the objects. Objects represented by events 203 with coordinates on one side of the separation curve 220 are left in the fiber flock stream 9, whereas objects represented by events 204 with coordinates on the other side of the separation curve 220 are separated from the fiber flock stream 9. Events 203, 204 corresponding to the allowed and disallowed objects, respectively, may be represented by different graphical symbols, for example, different shapes, different colors, and/or different fills. In the exemplary embodiment of FIG. 2, permissible events 203 are represented by empty circles, while impermissible events 204 are represented by filled circles.

The separation criterion can be predetermined by an operator's input, can be taken from a database containing various types of separation criteria, or can be calculated automatically.

In the exemplary embodiment of FIG. 2, the separation curve 220 is independent of the object classes 210 and thus can be substantially freely defined by an operator. Alternatively, the separation curve 220 can follow the object class boundaries 211, 212.

For the following explanations of the invention, it will be assumed for simplicity that each of the cameras 106 (FIG. 1) is adapted to receive and distinguish between red and green light. This can be achieved, for example, by providing the camera 106 with a digital receiver sensor comprising a plurality of picture elements, known as pixels, some of which are sensitive to red light and some of which are sensitive to green light. For this purpose, the pixels may be provided, for example, with red-transmitting or green-transmitting filters. Such digital cameras are known, wherein usually another part of the pixels is sensitive to blue light (RGB cameras). Furthermore, it is assumed that the light sources 103 emit red and green light. The light sources 103 may be broadband white light sources. Alternatively, the light sources 103 may be narrow band light sources, some of which emit only red light and some of which emit only green light. In another embodiment, the light sources 103 may periodically emit alternating red or green light.

Figure 3:
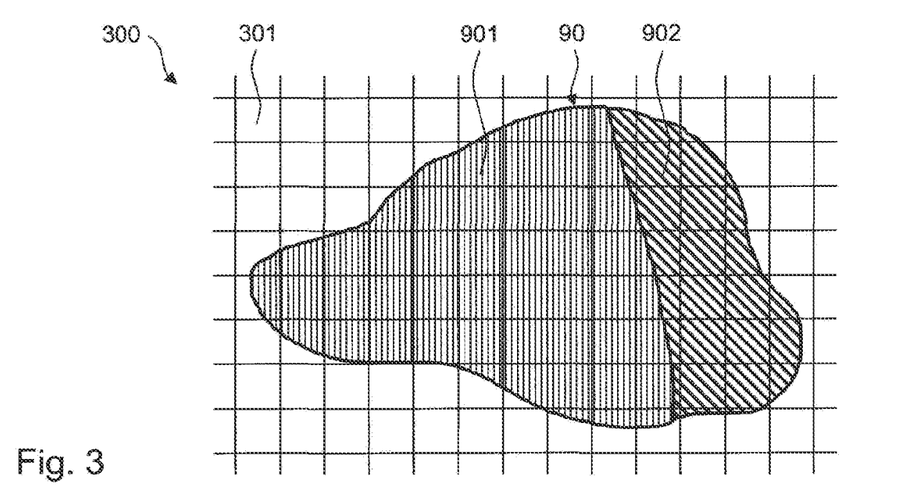
FIG. 3 shows a schematic picture of a foreign material.

FIG. 3 schematically shows an image 300 of a foreign material 90 as it may appear in the fiber flock stream 9. The image 300 is captured by one or both of the cameras 106 (FIG. 1). Without limiting generality, it is assumed that the image 300 is taken in reflected light, i.e., light reflected from the foreign material 90. The grid indicates the pixels 301 that make up the image 300. The foreign material 90 can be of different colors. In the example of FIG. 3, it consists of a first region 901 reflecting red light and a second region 902 reflecting green light.

The image 300 is processed by means of image processing. Image processing may be performed in the camera or cameras 106 themselves, in another component of the sensor system 105, and/or in the evaluation unit 107. The evaluation described below is based on data resulting from the image processing. The evaluation is preferably performed in the evaluation unit 107.

The foreign materials 90 are automatically classified into color classes. Each detected color, red and green in the present example, is assigned a color class. A multicolored foreign material 90 can be classified into the color class corresponding to the color of the majority of its area, or to the majority of the pixels 301 of its image 300. Thus, in the example of FIG. 3, the foreign material 90 is classified into the color class "red". Alternative classification methods are possible, e.g., according to the color of the largest contiguous area.

Figure 4:
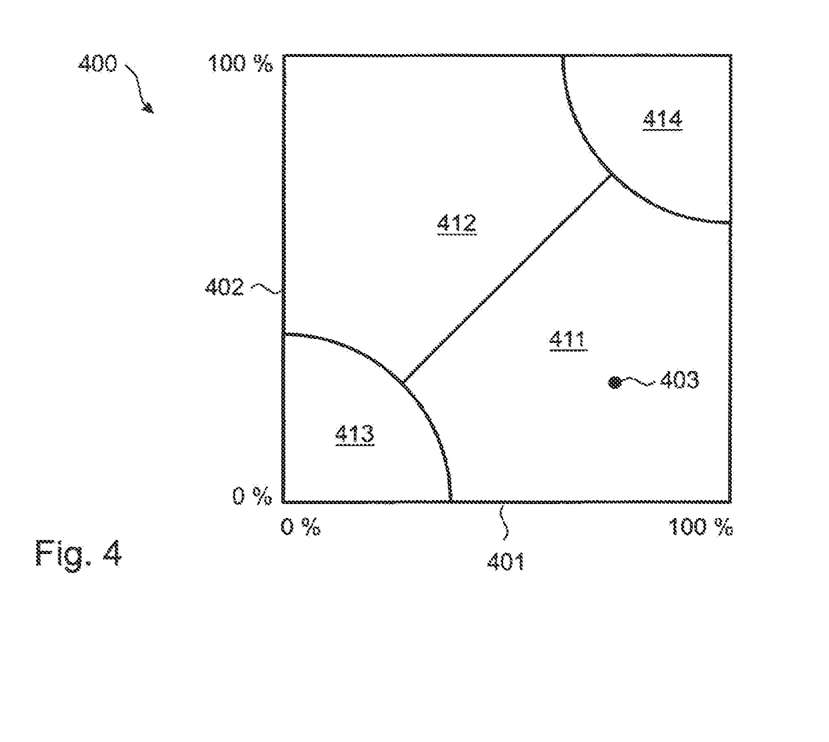
FIG. 4 shows an example of a diagram that can be used for color classification of the foreign materials.

An example of a diagram 400 that can be used for color classification of the foreign materials 90 is shown in FIG. 4. The square diagram 400 is spanned by two mutually perpendicular axes 401, 402. Along a first axis 401, a proportion of the color red is plotted, and along a second axis 402, a proportion of the color green is plotted on the area of a respective foreign material 90. The diagram 400 is divided into four color classes 411-414: a first color class 411 for red foreign materials 90, a second color class 412 for green foreign materials 90, a third color class 413 for blue/black foreign materials 90, and a fourth color class 414 for yellow/white foreign materials. In the image of the foreign material 90 (see FIG. 3), for each detected color, in the present example red and green, the pixels with the respective color can be counted and for each detected color a proportion of the pixels to the total number of pixels can be determined. The two proportions define coordinates of a point 403 in the diagram 400 representing the foreign material 90. The foreign material 90 is classified in the color class in which its point 403 is located, i.e., in the example of FIG. 4 in the first color class 411 "Red".

A separation criterion is defined for each color class 411-414, as shown by separation curve 220 in FIG. 2. Foreign materials 90 are separated from the fiber flock stream 9 or left in the fiber flock stream 9 depending on the separation criterion defined for their color class 411-414.

If a statistically relevant sample of classified foreign materials 90 is available, a frequency distribution of the foreign materials 90 is automatically determined for each of the color classes 411-414. The frequency distribution can refer to all detected foreign materials 90, to those separated from the fiber flock stream 9 and/or to those foreign materials 90 remaining in the fiber flock stream 9. In the example discussed herein, without limiting generality, the frequencies of the foreign materials 90 separated from the fiber flock stream 9 are considered.

The size of the sample of classified foreign materials 90 required for statistical relevance will depend on the circumstances. In many cases, it will be sufficient to determine it empirically. In a first embodiment, a fixed value for the sample size may be specified, e.g., at least 500 and preferably at least 5000 foreign materials 90. In a second embodiment, the sample may consist of all foreign materials 90 classified within a sufficiently large time interval, e.g., one hour. The time interval may follow up the current time. In a third embodiment, the sample may consist of all foreign materials 90 classified within a sufficiently large mass, e.g., 500 kg, of the fiber flock stream 9. The person skilled in the art can refer to the statistical literature for further, more complex procedures for determining the required sample size.

In FIG. 5, exemplary frequency distributions of the foreign materials 90 separated from the fiber flock stream 9 are shown in several color classes 411-414 in bar charts 500. A relative or absolute frequency of the foreign materials 90 is plotted along a vertical axis 502 of the respective bar chart 500. The area or height of each column indicates a proportion or frequency 511-514 of the foreign materials 90 separated from the fiber flock stream 9. The frequencies 511-514 correspond to color classes 411-414: a first frequency 511 of separated red foreign materials 90, a second frequency 512 of separated green foreign materials 90, a third frequency 513 of separated blue/black foreign materials 90, and a fourth frequency 514 of separated yellow/white foreign materials 90.

Figure 5A:
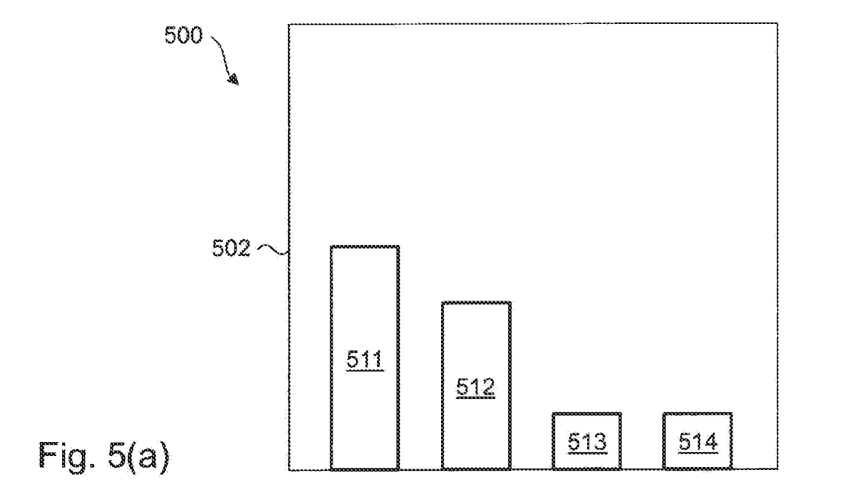
FIG. 5 shows two examples of column diagrams for the representation of frequencies of foreign materials separated from the fiber flock stream in several color classes.
Figure 5B:
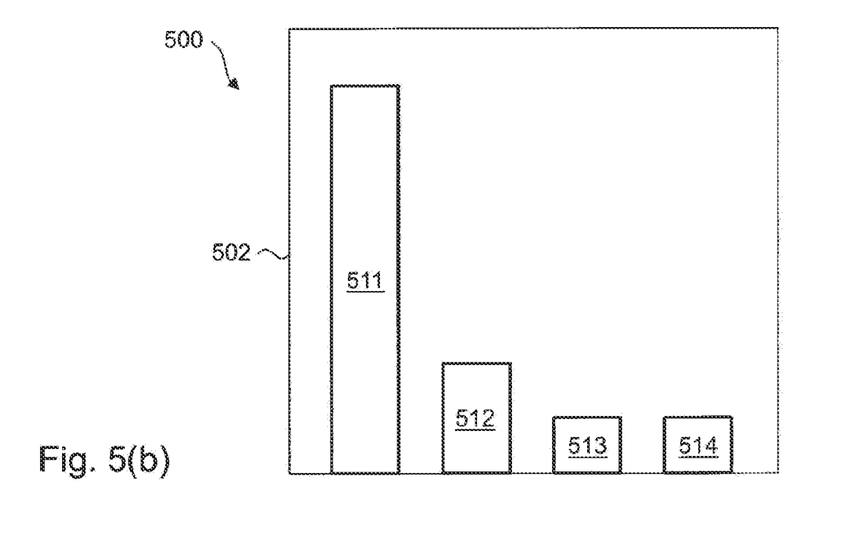

For example, the two bar charts 500 of FIGS. 5(a) and 5(b) may indicate frequencies 511-514 determined at the same device 100 at different points in time. The frequency distribution 511-514 at a first point in time according to FIG. 5(a) may serve as a reference frequency distribution. The frequency distribution 511-514 at a second, later point in time according to FIG. 5(b) is compared with the reference frequency distribution. Obviously, in the present example, the frequency distribution 511-514 according to FIG. 5(b) deviates significantly from the reference frequency distribution according to FIG. 5(a), in particular in that the first frequency 511 of separated red foreign materials 90 has increased at the expense of the second frequency 512 of separated green foreign materials 90. In the case of such a significant deviation, an optimization action is automatically performed according to the invention.

The optimization action can, for example, consist of the output of a visual and/or audible warning signal. The warning signal draws the attention of an operator to the deviation. In addition or alternatively to the warning signal, the frequency distribution can be output to the operator, e.g. in graphical form as in FIG. 5 on the output unit 108 (FIG. 1). In addition or alternatively to the warning signal and/or the output of the frequency distribution, a recommendation for action can be automatically output to the operator, e.g., "Set separation criterion for color class 'red' to a more sensitive level!" Thereupon, the operator can set the separation criterion for the first color class "Red" 411 more sensitive, so that more foreign materials 90 are separated from the fiber flock stream 9 with an unchanged fiber flock stream 9 in the first color class "Red" 411. Alternatively, the change in the separation criterion can be made automatically by the evaluation unit 107.

In the above embodiment, the reference frequency distribution according to FIG. 5(a) is the frequency distribution 511-514 of the separated foreign materials 90 previously determined at the same device 100. In another embodiment, the reference frequency distribution may depend on a frequency distribution of the foreign materials separated from another fiber flock stream determined at another device. For example, the reference frequency distribution may originate from exactly one simultaneously running device according to the invention or may be an average value of frequency distributions of several simultaneously running devices according to the invention.

For the optimization action to be triggered, the deviation of the frequency distribution 511-514 from the corresponding reference frequency distribution must be significant, i.e., sufficiently large. When this is the case can be determined depending on the circumstances. In a first alternative, individual frequencies 511 can be compared with each other and, for example, a threshold value for the deviation can be specified, e.g., as a fraction of the reference frequency or as a fixed value on the vertical axis 502. In a second alternative, ratios of frequencies can be considered, e.g., the ratio of the first frequency 511 to the second frequency 512. The person skilled in the art can refer to the statistical literature for further, more complex procedures for determining significance.

The bar charts 500 of FIG. 5 are only one of many ways to represent the frequency distribution 511-514 of the foreign materials 90. Other possible types of charts, such as a pie chart, are known. If a time course of the frequency distribution 511-514 is considered, a line chart may be advantageous. The plot may be output to an operator on the output unit 108 (FIG. 1). In other embodiments, the frequency distribution 511-514 need not be displayed and output at all. An output of a warning signal together with a corresponding reason or a corresponding recommendation for action may suffice. The display may also be omitted if the change in the separation criterion is made automatically.

The above example with only two colors red and green serves as a simple explanation of the invention. Of course, the invention also includes embodiments with more than two colors, for example with the three colors red, green and blue. In the latter case, the two-dimensional diagram 400 of FIG.

4 can be extended to the three-dimensional RGB color space. Alternatively, other color systems such as a color wheel can be used. The "colors" need not be narrow-band regions of the visible spectrum, but may be different sub-regions of the electromagnetic spectrum, each of which need not be contiguous.

Figure 6:
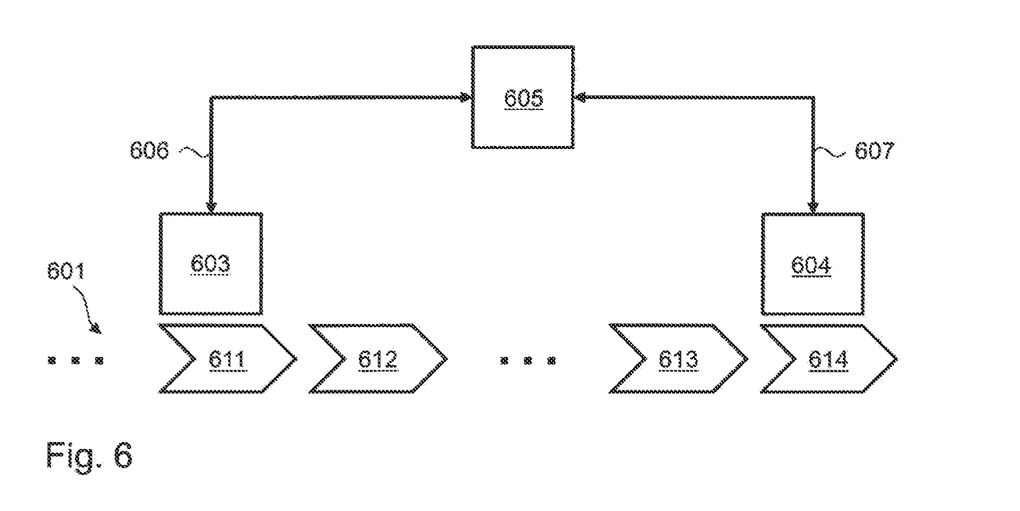
FIG. 6 shows schematically a part of a yarn production process in a spinning mill, in which an embodiment of the method according to the invention can be applied.

FIG. 6 shows schematically a part of a yarn production process 601 that takes place in a spinning mill. In the yarn production process 601, yarn is spun from raw cotton, for example. The yarn production process 601 may include, for example, the following process steps: opening, coarse cleaning, blending, fine cleaning 611, carding 612, doubling, combing, drafting, spinning 613, rewinding 614. Not all of the above process steps 611-614 need to be gone through, and other process steps may be added. For the sake of simplicity, only a few process steps 611-146 are schematically drawn in FIG. 6, while others are indicated by dots.

At a first location in an early stage of the yarn production process 601, e.g., in or immediately after the fine cleaning 611, a fiber flock stream 9 (FIG. 1) is present, which is pneumatically conveyed in an air stream. At this first location there is a device according to the invention, which is designated by the reference sign 603 in FIG. 6.

At a second location of the yarn production process 601, which is downstream with respect to the first location, yarn spun from the fiber flocks is conveyed along its longitudinal direction, e.g., during rewinding 614. A yarn monitoring device 604 is located at this second location. The yarn monitoring device 604 is adapted to monitor the yarn for foreign materials. It may be implemented, for example, as a yarn clearer system. Yarn clearers for optically monitoring a running yarn for foreign materials are known per se, for example from WO2011/026249 A1. Accordingly, the yarn monitoring device 604 includes a sensor system that detects measured values of an optical measurement on a yarn section along the longitudinal direction of the yarn. The sensor system is configured to detect and distinguish between foreign materials of the at least two colors to which color classes 411-414 are assigned. The yarn monitoring device 604 further includes an evaluation unit for determining values of a reflectivity of the measured yarn section from the measured values. The evaluation unit classifies the foreign materials in the yarn into the at least two color classes 411-414 and determines frequencies, with respect to all color classes 411-414, of the foreign materials in the at least two color classes 411-414.

In the embodiment according to FIG. 6, the yarn monitoring device 604 is connected to a central control device 605, which is represented by an arrow 607. The central control device 605 is in turn connected to the device 603 according to the invention, which is represented by an arrow 606. The data connections 606, 607 enable an exchange of data between the respective devices 603, 604, 605 involved. It is advantageous if both data connections 606, 607 are configured for bidirectional data exchange. For this purpose, the device 603 according to the invention and the yarn monitoring device 604 are each equipped with transmitting means for transmitting data and with receiving means for receiving data. The data connections 606, 607 can be cable-connected or wireless.

The central control device 605 can be designed as a stand-alone device, e.g., as a computer located in the spinning mill or outside the spinning mill. It includes appropriate receiving and transmitting means for receiving and transmitting data, respectively. Alternatively, the central control device 605 may be integrated in another device, e.g., in a yarn testing device in the textile laboratory of the spinning mill, in the device 603 according to the invention, in the yarn monitoring device 604, etc. In the latter two cases, there may be a direct data link between the yarn monitoring device 604 of the device 603 according to the invention, via which the two devices 604, 603 transmit or exchange data.

Along the connection 606 and/or 607 there may be further devices (not shown) which receive the transmitted data, process them if necessary and transmit them further. In one embodiment, several devices 603 according to the invention are connected to a fiber flock expert system. The fiber flock expert system is configured to receive data from the devices 603 according to the invention, to process them and to output them in a suitable form, and to control the devices 603 according to the invention. It is in turn connected to the central control device 605. In one embodiment, a plurality of yarn monitoring devices 604 are connected to a yarn expert system. The yarn expert system is configured to receive data from the yarn monitoring devices 604, to process them and to output them in a suitable form, and to control the yarn monitoring devices 604. It is in turn connected to the central control device 605.

In one embodiment of the method according to the invention, the reference frequency distribution is dependent on the frequency distribution of the foreign materials 90 remaining in the fiber flock stream 9 determined on a yarn produced from the fiber flock stream 9. Based on the current reference frequency distribution, the separation criterion defined for the relevant color class 411-414 is changed, and preferably changed automatically. Thus, the frequency distribution of the foreign materials 90 remaining in the fiber flock stream 9 is controlled. A control loop is present in which the device 603 according to the invention is the controlled system, the central control device 605 is the controller and the data link 607 is the feedback.

It is understood that the present invention is not limited to the embodiments discussed above. With knowledge of the invention, the person skilled in the art will be able to derive further variants which also form part of the subject matter of the present invention.

LIST OF REFERENCE SIGNS

100 Device according to the invention
101 Fiber transport channel
102 Window in wall of fiber transport channel
103 Light sources
104 Mirror
105 Sensor system
106 Cameras
107 Evaluation unit
108 Output unit
109 Separation unit
110 Separation channel
200 Event field
201, 202 First and second axis of the event field
203 Permissible event
204 Inadmissible event
205 Scatter plot
210 Areas in the event field representing object classes
211 Horizontal class boundaries
212 Vertical class boundaries
220 Separation curve
300 Image of a foreign material
301 Pixel
400 Color Classification Diagram
401, 402 First and second axis of the diagram respectively
403 Point in the diagram representing the foreign material 411-414 Color classes
500 Bar chart
502 Vertical axis of the bar chart
511-514 Frequencies of foreign materials
601 Yarn production process
603 Device according to the invention
604 Yarn monitoring device
605 Central control device
606, 607 Data connections
611 Fine cleaning
612 Carding
613 Spinning
614 Rewinding
9 Fiber flock stream
90 Foreign material
91 Transport direction of the fiber flock stream
92 Separation direction
901 Red area of the foreign material
902 Green area of the foreign material

The invention claimed is:

1. Method for optimizing a yarn production process in which foreign materials (90) are monitored in a textile fiber formation (9), wherein
the textile fiber formation (9) is irradiated with electromagnetic radiation from at least two different subranges of the electromagnetic spectrum,
the electromagnetic radiation interacts with the foreign materials (90), and
foreign materials (90) are detected based on their interaction with the electromagnetic radiation,
characterized in that
a color class (411-414) of foreign materials (90) is assigned to each of at least two different subranges of the electromagnetic spectrum depending on the interaction of the electromagnetic radiation in the respective subrange of the electromagnetic spectrum with the foreign materials (90),
the detected foreign materials (90) are automatically classified in the at least two color classes (411-414) depending on their interaction with the electromagnetic radiation in the relevant subrange of the electromagnetic spectrum,
when a sample having a plurality of classified foreign materials (90) is available, a frequency distribution (511-514) of the foreign materials (90) is automatically determined for the color classes (411-414),
the determined frequency distribution (511-514) is automatically compared with a reference frequency distribution, and
in case of a significant deviation of the determined frequency distribution (511-514) from the reference frequency distribution, at least one of a set of several optimization actions is performed automatically.

2. Method according to claim 1, wherein the set of multiple optimization actions includes at least one of the following:
a warning signal is output;
a recommendation is issued;
the determined frequency distribution (511-514) is output.

3. Method according to claim 1, wherein
a separation criterion is defined for each of the at least two color classes (411-414),
foreign materials (90) are separated from the textile fiber formation (9) according to the at least two separation criteria, and
the frequency distribution relates to the foreign materials (90) separated from the textile fiber formation (9) and/or the foreign materials (90) remaining in the textile fiber formation (9).

4. Method according to claim 3, wherein the set of multiple optimization actions includes any of the following:
the separation criterion defined for the relevant color class (411-414) is changed in such a way that, with the textile fiber formation (9) remaining unchanged, more foreign materials (90) in the relevant color class (411-414) are separated from the textile fiber formation (9);
the separation criterion defined for the relevant color class (411-414) is changed in such a way that, with the textile fiber formation (9) remaining unchanged, fewer foreign materials (90) in the relevant color class (411-414) are separated from the textile fiber formation (9).

5. Method according to claim 3, wherein the at least two separation criteria are dependent on a reflectivity and/or transmissivity of the foreign materials (90) in the relevant subrange of the electromagnetic spectrum.

6. Method according to claim 3, wherein the at least two separation criteria are dependent on a spatial extension of the foreign materials (90).

7. Method according to claim 1, wherein the reference frequency distribution is dependent on at least one previously determined frequency distribution (511-514) of the foreign materials (90) for the color classes (411-414).

8. Method according to claim 1, wherein the reference frequency distribution is dependent on at least one frequency distribution of the foreign materials for the color classes (411-414) determined on another, similar textile fiber formation.

9. Method according to claim 1, wherein the textile fiber formation (9) is a fiber flock stream or a yarn.

10. Method according to claim 1, wherein the reference frequency distribution is dependent on at least one frequency distribution of the foreign materials for the color classes (411-414) determined at a textile fiber formation produced from the textile fiber formation (9) downstream in the textile production process.

11. Method according to claim 10, wherein the textile fiber formation (9) is a fiber flock stream, and the downstream textile fiber formation is a yarn.

12. Method according to claim 1, wherein the reference frequency distribution is dependent on at least one frequency distribution of the foreign materials for the color classes (411-414) determined at a textile fiber formation produced from the textile fiber formation (9) upstream in the textile production process.

13. Method according to claim 12, wherein the textile fiber formation (9) is a yarn, and the upstream textile fiber formation is a fiber flock stream.

14. Method according to claim 1, wherein
during the interaction of the electromagnetic radiation with the foreign materials (90), an image (300) or one image each of the textile fiber image (9) is recorded in the at least two different subranges of the electromagnetic spectrum,
the image (300) or the at least two images are processed by means of image processing, and
the foreign materials (90) are detected based on data resulting from the corresponding image processing.

15. Method according to claim 1, wherein the sample consists of at least 500 and preferably at least 5000 classified foreign materials (90).

16. Device (100) for optimizing a yarn production process in which foreign materials (90) are monitored in a textile fiber formation (9), including

- at least one light source (103) for illuminating the textile fiber formation (9) with electromagnetic radiation from at least two different subranges of the electromagnetic spectrum,
- at least one sensor system (105) for detecting foreign materials (90) based on their interaction with the electromagnetic radiation, and
- an evaluation unit (107) connected to the sensor system (105) for evaluating an output signal of the sensor system (105),
- characterized in that
- the evaluation unit (107) is configured
- to assign a color class (411-414) of foreign materials (90) to each of at least two different subranges of the electromagnetic spectrum depending on the interaction of the electromagnetic radiation in the respective subrange of the electromagnetic spectrum with the foreign materials (90),
- to classify the detected foreign materials (90) in the at least two color classes (411-414) depending on their interaction with the electromagnetic radiation in the relevant subrange of the electromagnetic spectrum,
- when a sample having a plurality of classified foreign materials (90) is available, to determine a frequency distribution (511-514) of the foreign materials for the color classes,
- to compare the determined frequency distribution (511-514) with a reference frequency distribution, and
- to trigger at least one of a set of several optimization actions in case of a significant deviation of the determined frequency distribution (511-514) from the reference frequency distribution.

17. Device (100) according to claim 16, wherein the set of multiple optimization actions includes at least one of the following:

- a warning signal is output;
- a recommendation is issued;
- the determined frequency distribution (511-514) is output.

18. Device (100) according to claim 16, additionally containing a separation unit (109) for selectively separating objects from the textile fiber formation (9), wherein the evaluation unit (107) is connected to the separation unit (109) and is configured

- to store a separation criterion for each of at least two color classes (411-414),
- to trigger a separation of the foreign materials (90) from the textile fiber formation (9) by the separation unit (109) according to the at least two separation criteria, and
- to determine the frequency distribution (511-514) in such a way that it relates to the foreign materials (90) separated from the textile fiber formation (9) and/or the foreign materials (90) remaining in the textile fiber formation (9).

19. Device (100) according to claim 18, wherein the set of multiple optimization actions includes at least one of the following:

- the separation criterion defined for the relevant color class (411-414) is changed in such a way that, with the textile fiber formation (9) remaining unchanged, more foreign materials (90) in the relevant color class (411-414) are separated from the textile fiber formation (9);
- the separation criterion defined for the relevant color class (411-414) is changed in such a way that, with the textile fiber formation (9) remaining unchanged, fewer foreign materials (90) in the relevant color class (411-414) are separated from the textile fiber formation (9).

20. Device (100) according to claim 16, wherein the device (100) is a fiber cleaner or a yarn clearer.

21. Device (100) according to claim 16, wherein the sensor system (105) includes at least one digital camera (106).

* * * * *